United States Patent [19]

Cronin

[11] Patent Number: 4,494,372
[45] Date of Patent: Jan. 22, 1985

[54] MULTI ROLE PRIMARY/AUXILIARY POWER SYSTEM WITH ENGINE START CAPABILITY FOR AIRCRAFT

[75] Inventor: Michael J. Cronin, Sherman Oaks, Calif.

[73] Assignee: Lockheed Corporation, Burbank, Calif.

[21] Appl. No.: 502,902

[22] Filed: Jun. 10, 1983

[51] Int. Cl.³ .......................... F02C 7/268; F02C 7/32
[52] U.S. Cl. .................................. 60/39.07; 60/39.142
[58] Field of Search .............. 60/39.07, 39.142, 39.15, 60/39.183, 39.33; 290/4 C, 52

[56] References Cited

U.S. PATENT DOCUMENTS

| 2,777,301 | 1/1957 | Kuhn | 60/39.07 |
| 2,949,731 | 8/1960 | Hambling | 290/52 |
| 3,145,532 | 8/1964 | Moss | 60/39.142 |
| 3,171,252 | 3/1965 | Trobridge | 60/39.142 |
| 3,187,188 | 6/1965 | Adkins | 290/52 |
| 3,465,162 | 9/1969 | Oprecht | 290/52 |
| 3,965,673 | 6/1976 | Friedrich | 60/39.142 |

Primary Examiner—Louis J. Casaregola
Attorney, Agent, or Firm—Louis L. Dachs

[57] ABSTRACT

The invention is a multi role primary/auxiliary power system with engine start capability for aircraft that provides electric, mechanical and air conditioning power as well as engine starting functions. The compressor (20), turbine (26) and motor/generator (24) are coupled to a drive shaft (14) of the aircraft's engine (12) with the motor/generator (24) mounted between the compressor (20) and turbine (26). A first clutch (28) is mounted on the drive shaft (14) between the motor/generator (24) and the turbine (26). Coupled to the outlet (29) of the compressor (20) is a two-way valve (34) adapted to couple the compressor (20) to either a first duct (36) or second duct (37). Both of these ducts (36), (37) are coupled at their opposite ends to the turbine (26). Mounted in the first duct (36) is a combustor (40) and in the second duct (37) a first heat exchanger (42). A third duct (44) is also coupled between the compressor (20) and the turbine (26) and which incorporates a valve (50). Mounted between the turbine (26) and the engine (12) is a gear reduction assembly (58). Coupled to the output of the turbine (26) is a fourth duct (100) which is coupled to a second two-way valve. The second two-way valve (102) either couples the fourth duct (100) to an overboard vent (104) or a fifth duct (106), having a heat exchanger (108) mounted therein to the cabin of the aircraft. Coupling the first, second and third ducts (36), (37), and (44) together is a bypass duct (110) (sixth duct) which bypasses the turbine (26) and connects to the fourth duct (100). The sixth duct (110) also incorporates a simple open/close valve (112). Finally, a control circuit (115) for the motor/generator is provided which can couple either onboard battery power or ground supply AC power to the motor/generator.

8 Claims, 1 Drawing Figure

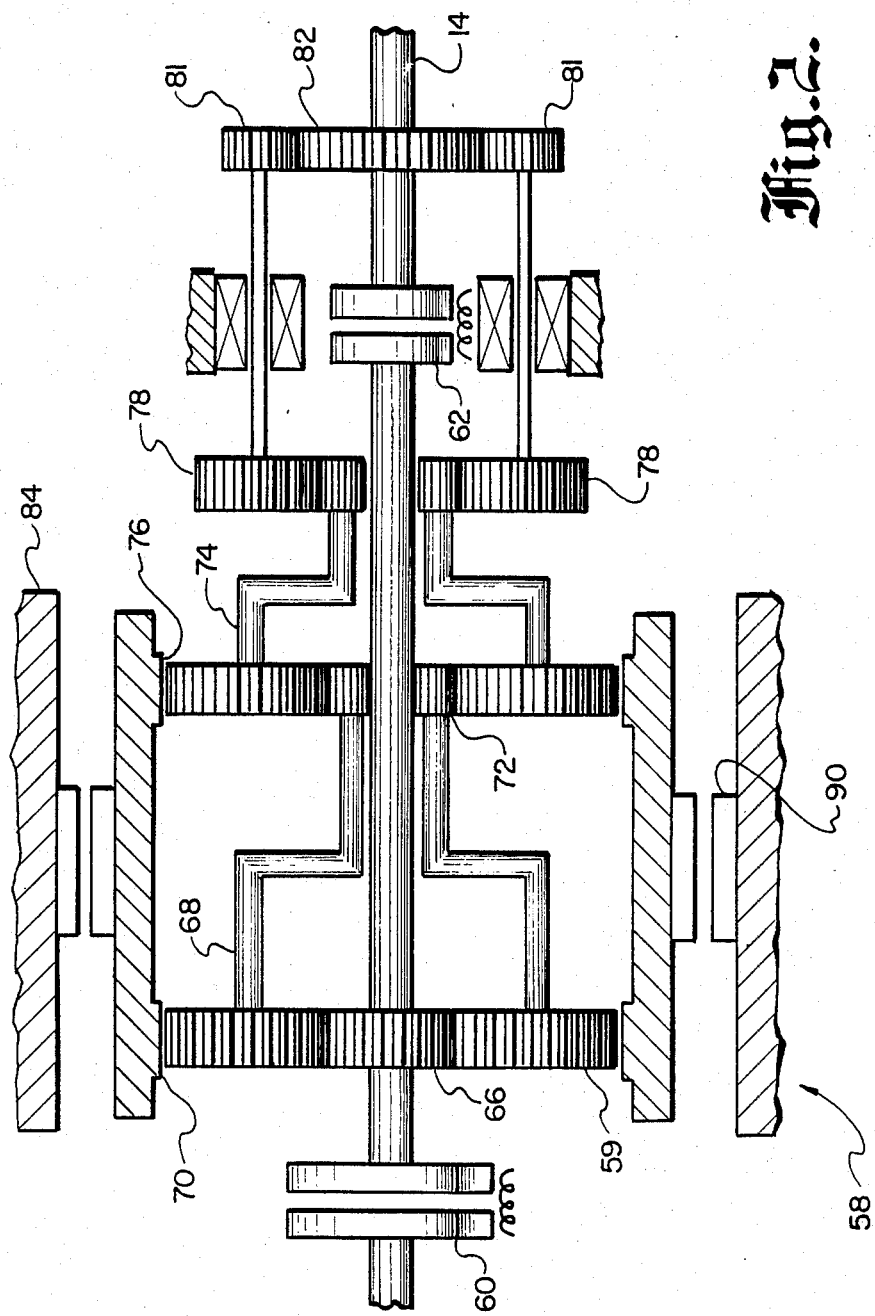

MULTI ROLE PRIMARY/AUXILIARY POWER SYSTEM WITH ENGINE START CAPABILITY FOR AIRCRAFT

TECHNICAL FIELD

The invention relates to the field of primary/auxiliary power systems for aircraft and more particularly to an auxiliary power system that can be used to start the aircraft engine(s).

BACKGROUND ART

Most secondary power systems for aircraft normally make use of the following different power sources: (1) Engine compressor (bleed air) power, (2) pneumatic power, (3) hydraulic power, (4) electrical power, and (5) mechanical power. These multiple power systems are individually complex and require a significant amount of design development and testing. They are also extremely costly to produce and require a significant amount of maintenance and ground logistic support.

Military aircraft pose special problems not found in commercial aircraft to the extent that they cannot usually rely on the availability of ground support equipment for powering hydraulic, pneumatic, electronic and air conditioning systems as well as engine start functions. Such is the case where military aircraft are located in dispersed and "bare site" areas where the necessary ground support equipment may not be on hand.

A typical prior art combined starting and auxiliary power system can be found in U.S. Pat. No. 2,582,848 "Aircraft Power Plant and Cabin Pressurizing System," by N. C. Price. Price discloses a system wherein an electric motor is used to drive a compressor which supplies pressurized air to charge a storage tank. To start the engine, air from the tank is ducted to a turbine which is mechanically coupled to the main engine by a drive shaft. Once the engine is started, however, bleed air from the engine is used to power the environmental control system of the aircraft. This system has the disadvantage of requiring bleed air from the engine to run the environmental control system which greatly affects the performance parameters of the engine such as thrust and fuel consumption. Furthermore, the storage tank adds weight to the aircraft.

Another system of interest can be found in U.S. Pat. No. 2,777,301 "All-Purpose Power and Air Conditioning System," by J. Kuhn. Kuhn discloses the use of a conventional auxiliary power unit comprising a turbine, compressor and combustor and further incorporates a generator mounted on the drive shaft between the compressor and the turbine. The output of the compressor is used to supply high pressure air to a pneumatic starter. Separate turbine and compressor assemblies are required to produce conditioned air for the cabin. Here the disadvantage is the weight penalty due to the need for a separate turbine and compressor for air conditioning.

Another example of using compressed air from a gas turbine to start a jet engine can be found in U.S. Pat. No. 3,965,673 "Apparatus for Starting Aircraft Engines and For Operating Auxiliary On-Board Power Generating Equipment," by Helmut Friedrich. Other patents of interest include U.S. Pat. No. 3,834,161 "Dual Mode Auxiliary Power Unit," by Richard E. Quigley, Jr, and Buryl L. McFadden, Jr.; U.S. Pat. No. 4,149,371 "Air Supply Control System," by Wilbur A. Spraker and Kenneth F. Kaiser; U.S. Pat. No. 3,279,169 "Arrangement for Starting and Adjusting the Operation of a Power Generator Incorporating a Gas Turbine," by Gaston Bayard; U.S. Pat. No. 4,312,179 "Gas Turbine Power Plant with Air Reservoir and Method of Operation," by Paul Zaugg; and U.S. Pat. No. 4,196,773 "Heating and Air Cooling System Employing a Gas Turbine," by Paul R. Trumpler.

Therefore, a primary object of the present invention is to provide a multi role primary/auxiliary power system for an aircraft that also provides an engine start function for at least one aircraft engine.

It is another object of the present invention to provide a multi role primary/auxiliary power system for an aircraft that provides the aircraft with self-sufficiency when external ground support equipment is unavailable.

A further object of the subject invention is to utilize engine shaft power to drive the electro and turbo-machinery so as to furnish mechanical, electical and air conditioning power.

A still further object of the invention is to utilize internal and external electric power to provide the electric and air conditioning loads in an aircraft.

DESCRIPTION OF THE INVENTION

The invention is a multi role primary/auxiliary power system for an aircraft which comprises the integration of mechanical, electrical and turbo-machinery to provide electrical, mechanical and air conditioning as well as an aircraft engine start function. A compressor, turbine and motor/generator are commonly coupled to a drive shaft of the aircraft's engine with the motor/generator mounted between the compressor and turbine. A first clutch is mounted on the drive shaft between the motor/generator and the turbine. Coupled to the outlet of the compressor is a two-way valve adapted to couple the compressor either to a first or second duct. Both of these ducts are coupled at their opposite ends to the turbine. Mounted in the first duct is a fuel burning combustor and mounted in the second duct is a first heat exchanger. A third duct is also coupled between the compressor and the turbine and which incorporates an open/close valve.

Mounted between the turbine and the engine is a gear reduction assembly which incorporates second and third clutches mounted on the drive shaft. A gear reduction train is incorporated, having an input gear coupled to the drive shaft between the second and third clutches and an output gear coupled to drive shaft between the third clutch and the engine. A fourth clutch is coupled to the gear train and is adapted to allow the gear train to freewheel when disengaged.

Coupled to the output of the turbine is a fourth duct which is coupled to a second two-way valve. The second two-way valve either couples the fourth duct to an overboard vent or to a fifth duct, having a heat exchanger mounted therein, which is coupled to the cabin, avionics, etc., of the aircraft. Coupling the first, second and third ducts together is a bypass duct (sixth duct) which bypasses the turbine and connects these ducts to the fourth duct. The sixth duct also incorporates a modulating temperature control valve.

Finally, a control circuit for the motor/generator is provided which can couple either onboard battery power or ground supply ac power to the motor/generator.

The novel features which are believed to be characteristic of the invention both as to its organization and its method of operation, together with further objects and advantages thereof, will be better understood from the following description in connection with the accompanying drawings in which a presently preferred embodiment of the invention is illustrated by way of example. It is to be expressly understood, however, that the drawings are for purposes of illustration and description only, and are not intended as a definition of the limits of the invention.

BRIEF DESCRIPTION OF DRAWINGS

Illustrated in FIG. 1 is a schematic representation of the multi role primary/auxiliary power system; and

BEST MODE FOR CARRYING OUT THE INVENTION

Figure 1:
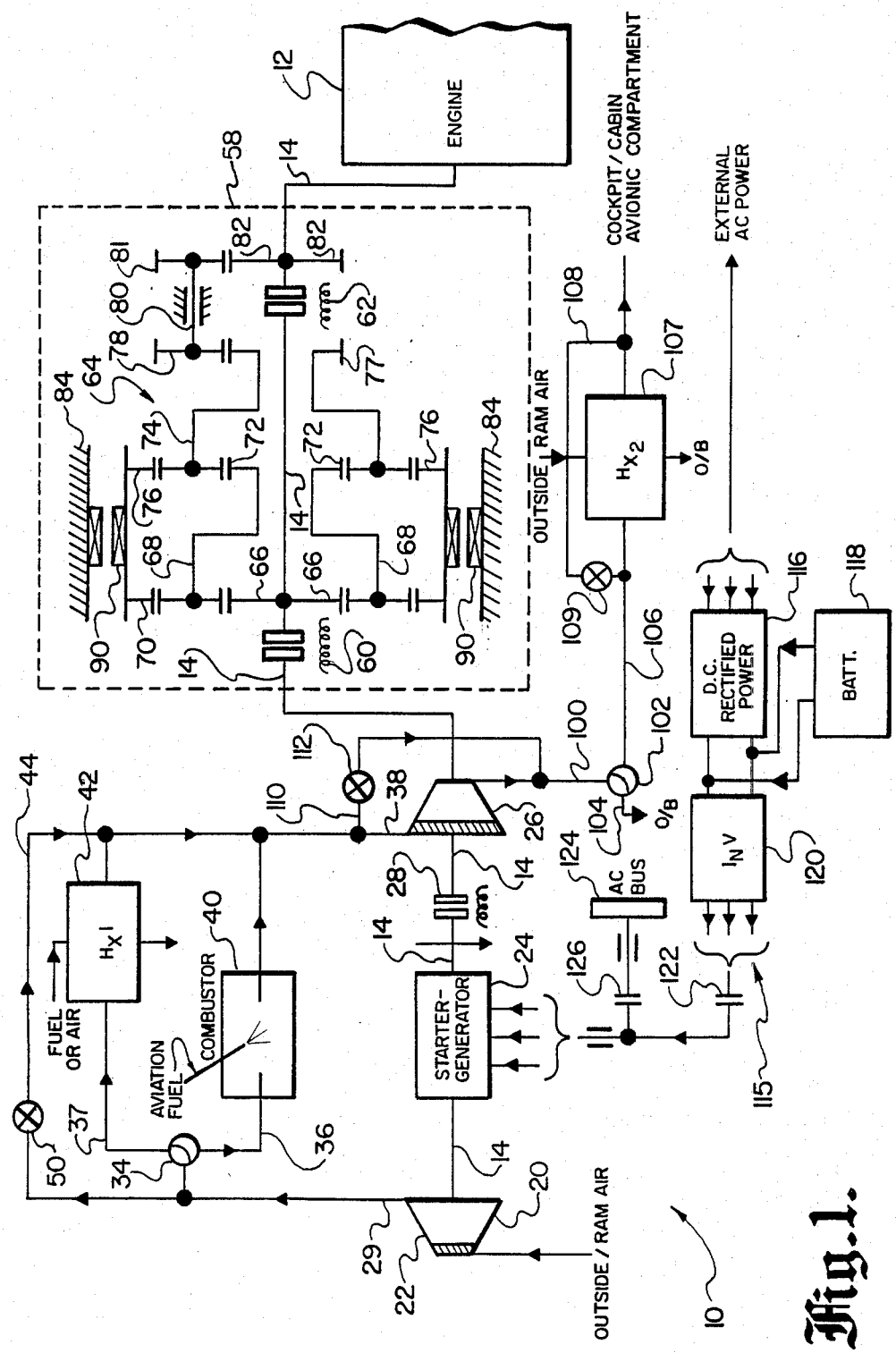

Illustrated in FIG. 1 is a schematic representation of the multi role primary/auxiliary powe system with engine start capability for an aircraft. Referring to FIG. 1, it can be seen that the system generally designated by numeral 10 is coupled to an engine 12 by means of a drive shaft 14. Coupled to the shaft 14 is a compressor 20 adapted to receive outside air (ram air) via inlet guide vanes 22. Mounted on the shaft 14 is a motor/generator 24 which in turn is coupled to a dual mode turbine 26. The motor/generator 24 is preferably a permanent magnet generator such as one using rare earth, samarium-cobalt magnets. Mounted between the motor/generator 24 and the turbine 26 is a clutch means which is, preferably, an electromechanical clutch 28.

Coupled to the outlet 29 of the compressor 20 is a first valve means, typically a two-way valve 34 adapted to couple the outlet 29 of the compressor 20 either to a duct 36 or 37. Both ducts 36 and 37 are coupled at their opposite ends to the inlet 38 of the turbine 26. Inserted within the duct 36 is a fuel-burning combustor 40 wherein the fuel/air mixture ratio is controlled to vary the temperature of the air entering the turbine 26 when used as a starter or APU turbine. Inserted in duct 37 is a heat exchanger 42 which is used to control the temperature of air flow when an air conditioning mode is selected. Also coupled to the outlet 29 of the compressor 20 is a third duct 44, having a second valve means in the form of a temperature modulating valve 50 which is used in the air conditioning mode. The duct 44 is also coupled at its opposite end to inlet 38 of the turbine 26.

Mounted between the turbine 26 and engine 12 is a planetary/spur gear reduction assembly, generally designated by numeral 58. The gear reduction assembly 58 incorporates a pair of clutch means, typically electromagnetic clutches 60 and 62, and a gear reduction train 64. In the example illustrated, a first sun gear 66 is attached to the drive shaft 14 connecting the clutches 60 and 62. The sun gear 66 in turn drives a planetary gear assembly 68 which in turn engages a first ring gear 70. The planetary gear assembly 68 is also coupled to a second sun gear 72 which in turn engages a second planetary gear assembly 74. The second planetary gear assembly 74 engages ring gear 76 (attached to the ring gear 70) and is also coupled to gear 77. Gear 77 interfaces with the spur gear 78 which is rotatably mounted and drives directly the spur gear set 81 and 82.

The ring gears 70, 76 being attached together are in turn coupled to the aircraft structure 84 via a fourth clutch means, typically, an electromagnetic clutch 90. It is necessary in the engine start mode that the clutch 90 be engaged to lock the ring gears 70, 76 and so permit transmittal of torque through the planetary/spur reduction gears. During this mode of operation, clutch 62 must be disengaged and clutch 60 engaged.

The turbo-machinery is so configured that turbine 26 can perform as a power turbine or as a cooling turbine; these alternative modes are determined by the position of the two-way valve 102. When valve 102 is in its first position, the duct 100 is coupled to an overboard vent 104 and in its second position the duct 100 is coupled to a duct 106. Duct 106 is, typically, coupled to the cockpit, cabin, avionics equipment, etc. Inserted in the duct 106 is a second heat exchanger 107. When necessary the heat exchanger of 107 can be bypassed by means of duct 108 incorporating temperature modulating valve 109. Coupled to ducts 37, 36, and 50 is a bypass duct 110 which couples these three ducts to the duct 100, bypassing the turbine 26. Inserted in the duct 110 is a temperature modulating valve 112.

A control circuit for the motor/generator, generally designated by numeral 115, includes a three-phase (phase-delayed) rectifier assembly 116 (with regulating means, not shown) and a power electronic inverter 120 designed to accept external ac power or dc power from an onboard battery 118. Normally open, electromagnetic three-phase contactors 122 and 126 are used to control the generating, air conditioning, and starting modes of the system. When the motor/generator 24 is in the motor-run mode, contactor 122 is closed, but when it is in a generating mode, contactor 126 is closed. Further operating details will be evident from the description under the itemized headings below.

Engine Start Mode. To start the engine, clutch 28 is placed in the open position while clutch 60, of the gear reduction assembly 58, is placed in the energized (closed) position; clutch 62 is also open at this time. Since torque must be transmitted to the engine via the planetary/spur gear assembly 58, clutch 90 is placed in the energized (closed) position, thereby preventing ring gears 70 and 76 from rotating. To provide the starting power, turbine 26 must operate as a hot gas turbine motor (power turbine) with the compressor 22 being driven by motor/generator 24 operating in its motoring mode. The high pressure discharge air from the compressor 22 is passed into the combustor 40 where it is mixed with fuel and ignited and then expanded through the power turbine 26. In this start mode, air exiting turbine 26 is vented overboard via duct 100 and vent 104. Note also, in this mode clutch 28 is open so the full power output of the turbine 26 is dedicated to the starting task. In other modes, the mechanical power derived from expanding hot air through turbine 26 is used to off-load the motor/generator 24 or to off-load the engine shaft 14.

In the foregoing operation, electrical power may be derived from the onboard battery 118 or from rectified ac power derived from electrical ground power source. Using either of these two dc power sources, the power electronic inverter 120 synthesizes the necessary three-phase ac power to the motor/generator 24 when it is used to drive the compressor, 20. Thus, during the engine starting operation, the motor is brought up to its rated speed and the inlet guide vanes, 22 are incrementally opened so that the full air mass flow of the compressor 22 is available when the motor reaches its full speed condition. At this time, the hot pressurized air is mixed with fuel in the proper fuel/air ratio mixture and ignited. Valves 50 and 112 are closed at this time, and the two-way valve 34 is positioned to direct air into the combustor 40. When the engine 12 is running at its idle speed, mechanical power from the engine is then used to drive the electric and turbo-machinery. To do this, clutches 28, 60 and 62 are closed and the clutch 90 is open, allowing the planetary/spur gear system of gear reduction assembly 58 to freewheel.

Air Conditioning. The following description first relates to an engine running condition, where the electric and turbo-machinery are driven by the engine. To provide cockpit avionic cooling, etc., on a hot day, the system 10 is operated in a mechanically-driven air cycle ("bootstrap") mode. To accomplish this, valves 50 and 112 are closed, while two-way valves 34 and 102 are positioned to direct air from the compressor 20 through the first heat exchanger 42 to the turbine 26 (now in an expansion cooling mode). After passage through the turbine 26, the conditioned air flows to the cockpit/avionic compartments. The second heat exchanger 108 will be bypassed at this time, while valve 112, will be modulated to control the amount of air bypassing the cooling turbine 26. During the expansion of the air through turbine 26, it will be cooled to a low temperature, causing moisture to be condensed and, thus, a condensing heat exchanger or water separator (not shown) will be required to remove the condensate. Also in this expansion/cooling process, mechanical power is extracted from the turbine 26 and will be used to decrease the amount of power delivered to the turbo-machinery by the engine. The motor/generator 24, will be in the generating mode at this time and three-phase contactors, 26 will be closed allowing it to supply the aircraft's electric power requirements.

If cooling is required on the ground on a hot day and external power is available, the operation is the same as described above, except that clutch 60 will be open and the motor/generator 24 will be operated in its motoring mode. Thus, external ground electric power can directly supply the aircraft loads, while the power to drive the motor/generator as a motor will be obtained from the phase delay rectifier assembly 116 and the power electronic inverter, 120. In this mode, the mechanical power developed by the cooling turbine 26 will now be used to offload the motor/generator 24 in its motor mode of operation.

Heating. On a cold day, when hot air is required, it can be provided by heat of compression, when compressor 20 is driven either by the engine or by motor/generator 24, operating as a motor. In the former case, clutches 28, 60 and 62 are closed, while clutch 90 is open and two-way valves 34 and 102 are positioned to direct air, via the first heat exchanger 42 and the second heat exchanger 108, into the cockpit. Air temperature is controlled mainly by valve, 50, with valve 112 open, thus, bypassing the turbine 26. It is of note that on the ground, in lieu of heat of compression, a Thyrister controlled electric heater (not shown) could be used to heat the air flow going into the cabin. In this mode by the inlet guide vanes 22 on the compressor would be set to minimize the pressure ratio and mass airflow. In this manner, with internal or external electric power, the load reflected to the motor/generator 24 would be minimized. During such operation, clutches 28 and 60 would be open and all other valves would be positioned as before.

Ground APU Operation. The following describes the operation of the electric turbo-machinery as an APU, so as to give self-sufficiency to the airplane in the absence of external power (or engine power). In this mode, the onboard battery 112 is used to accelerate the motor/generator 24 (operating in the motoring mode) up to "light-off" speed (the point at which sufficient compressed air is available for combustion with the fuel); at which point ignition is turned ON and the hot gases of combustion are expanded through turbine 26, causing it to function as a power turbine. Turbine 26 will now develop shaft power in proportion to the turbine inlet temperature and air mass flow and this will be used to drive the motor/generator, 24. In this mode, the motor/generator, 24, now operates as a generator to supply the electric bus, via the three-phase power contactor, 126.

During ground APU operation, clutch 14 is closed, clutch 60 is open and the two-way valves 34 and 102 are positioned, as in the engine start mode with valves (50) and (112) closed. Also, contactors 122 and 126 are open and closed, respectively.

While the multi role primary/auxiliary power system has been described with reference to a particular embodiment, it should be understood that the embodiment is merely illustrative as there are numerous variations and modifications that may be implemented by those skilled in the art. Thus, the invention is to be construed as being limited only by the spirit and scope of the appended claims.

Industrial Applicability

The multi role primary/auxiliary power system with engine start capability for aircraft has application on aircraft to provide electric, mechanical and air conditioning power (as well as aircraft engine starter capability).

I claim:

1. A multi role primary/auxiliary power system for an aircraft having at least one engine, said engine having a drive shaft, said power system comprising:
   a turbine coupled to said drive shaft;
   a compressor coupled to said drive shaft;
   a motor/generator coupled to said drive shaft, said motor/generator mounted between said compressor and said turbine;
   first passage means coupling the outlet of said compressor to said inlet of said turbine;
   a combustor mounted in said first passage means;
   first clutch means mounted on said drive shaft adapted to disengage said motor/generator from said turbine;
   a second passage means coupled to the outlet of said turbine and adapted to vent the output of said turbine overboard;
   third passage means coupling said second passage means to the cabin of said aircraft; and
   first valve means mounted in said second passage means adapted to close off the flow overboard in said second passage means and direct it to said third passage means.

2. The multi role primary/auxiliary power system of claim 1 including a gear reduction assembly comprising:
   a second clutch means mounted on said drive shaft between said turbine and said engine;
   a third clutch means mounted between said second clutch means and said engine;
   a gear reduction train having an input gear coupled to said drive shaft between said second and third clutch means; and an output gear coupled to said drive shaft between said third clutch means and said engine; and a fourth clutch means coupled to said gear train adapted to allow said gear train to freewheel when disengaged.

3. The multi role primary/auxiliary power system as set forth in claim 1 further comprising:

a fourth passage means coupling said compressor to said turbine; and a second valve means mounted to said fourth passage means adapted to control the airflow from said compressor to said turbine.

4. The multi role primary/auxiliary power system as set forth in claim 3 including:

a fifth passage means coupling said compressor to said turbine;

a heat exchanger mounted in said fifth passage means; and third valve means mounted to said first and fifth passage means adapted to control the flow of pressurized air from said compressor to either said first or fifth passage means.

5. The multi role primary/auxiliary power system as set forth in claim 4 including:

sixth passage means coupling said first, fourth and fifth passage means to said second passage means; and fourth valve means mounted in said sixth passage means to control the flow in said sixth passage means.

6. The multi role primary/auxiliary power system as set forth in claim 5 including:

a second heat exchanger mounted in said third passage means, a bypass duct coupled to said third passage means bypassing said second heat exchanger; and fifth valve means mounted in said bypass duct adapted to modulate flow around said second heat exchanger.

7. The multi role primary/auxiliary power system as set forth in claim 5 wherein said first, second, third and fourth clutch means are electrical mechanical clutches.

8. A multi role primary/auxiliary power system for an aircraft having at least one engine, said engine having a drive shaft, said power system comprising:

a turbine coupled to said drive shaft;

a compressor coupled to said drive shaft;

a motor/generator coupled to said drive shaft, said motor/generator mounted between said compressor and said turbine;

first passage means coupling the outlet of said compressor to said inlet of said turbine;

a combustor mounted in said first passage means; first clutch means mounted on said drive shaft adapted to disengage said motor/generator from said turbine; and a gear reduction assembly comprising:

a second clutch means mounted on said drive shaft between said turbine and said engine;

a third clutch means mounted between said second clutch means and said engine;

a gear reduction train having an input gear coupled to said drive shaft between said second and said third clutch means;

an output gear coupled to said drive shaft between said third clutch means and said engine; and a fourth clutch means coupled to said gear train adapted to allow said gear train to freewheel when disengaged.

* * * * *